US 11,733,028 B2

United States Patent
Yang et al.

(10) Patent No.: US 11,733,028 B2
(45) Date of Patent: Aug. 22, 2023

(54) SINGLE-LASER LIGHT SOURCE SYSTEM FOR COLD ATOM INTERFEROMETERS

(71) Applicant: NATIONAL UNIVERSITY OF DEFENSE TECHNOLOGY, Changsha (CN)

(72) Inventors: Jun Yang, Changsha (CN); Guochao Wang, Changsha (CN); Shuhua Yan, Changsha (CN); Lingxiao Zhu, Changsha (CN); Xiye Guo, Changsha (CN); Yaning Wang, Changsha (CN); Aiai Jia, Changsha (CN); Mengjie Lv, Changsha (CN); Dongyang Xu, Changsha (CN); Qixue Li, Changsha (CN); Mingyue Yang, Changsha (CN); Jie Wang, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 18/012,946

(22) PCT Filed: Nov. 24, 2020

(86) PCT No.: PCT/CN2020/131052
§ 371 (c)(1),
(2) Date: Dec. 26, 2022

(87) PCT Pub. No.: WO2022/032926
PCT Pub. Date: Feb. 17, 2022

(65) Prior Publication Data
US 2023/0228555 A1   Jul. 20, 2023

(30) Foreign Application Priority Data

Aug. 13, 2020 (CN) .......................... 202010810469.7

(51) Int. Cl.
*H01S 3/107* (2006.01)
*G01B 9/02015* (2022.01)
(Continued)

(52) U.S. Cl.
CPC ...... *G01B 9/02015* (2013.01); *H01S 3/06791* (2013.01); *H01S 3/08013* (2013.01);
(Continued)

(58) Field of Classification Search
CPC ............ G01B 9/02015; H01S 3/06791; H01S 3/08013; H01S 3/107; H01S 3/109;
(Continued)

(56) References Cited

U.S. PATENT DOCUMENTS

| 5,410,624 A | 4/1995 | Morkel |
| 10,331,087 B2 * | 6/2019 | Kotru .................. G04F 5/14 |

(Continued)

FOREIGN PATENT DOCUMENTS

| CN | 101706516 A | 5/2010 |
| CN | 105589074 A | 5/2016 |

(Continued)

OTHER PUBLICATIONS

9. F. Theron et al., "Frequency-doubled telecom fiber laser for a cold atom interferometer using optical lattices", Optics Communications, vol. 393, 2017, pp. 152-155 (Year: 2017).*

(Continued)

*Primary Examiner* — Xinning (Tom) Niu
(74) *Attorney, Agent, or Firm* — Bayramoglu Law Offices LLC

(57) ABSTRACT

A single-laser light source system for cold atom interferometers, comprising: a reference light module including a narrow-bandwidth laser and a frequency stabilization module and an optical frequency shift module including a first electro-optic modulator and a first narrow-bandwidth opti- (Continued)

cal-fiber filter. The first electro-optic modulator is connected to the first narrow-bandwidth optical-fiber filter by an optical fiber, and the first electro-optic modulator is connected to the laser by an optical fiber. The first electro-optic modulator receives an initial light from the laser, modulates the initial light by a modulation signal with a preset frequency, and generates sidebands with the preset frequency. The first narrow-bandwidth optical-fiber filter filters the optical signal at the output of the first electro-optic modulator to obtain a frequency-shifted light as the +1-order sideband. The frequency-shifted light is used for modulation to obtain a measurement and control light of the cold atom interferometer.

4 Claims, 6 Drawing Sheets

(51) Int. Cl.
  *H01S 3/067* (2006.01)
  *H01S 3/16* (2006.01)
  *H01S 3/08* (2023.01)
  *H01S 3/13* (2006.01)
  *H01S 3/109* (2006.01)
  *H01S 3/30* (2006.01)
  *H01S 3/136* (2006.01)

(52) U.S. Cl.
  CPC ............. *H01S 3/107* (2013.01); *H01S 3/109* (2013.01); *H01S 3/136* (2013.01); *H01S 3/13013* (2019.08); *H01S 3/1608* (2013.01); *H01S 3/302* (2013.01)

(58) Field of Classification Search
  CPC .... H01S 3/13013; H01S 3/136; H01S 3/1608; H01S 3/302
  See application file for complete search history.

(56) References Cited

U.S. PATENT DOCUMENTS

| | | | |
|---|---|---|---|
| 2010/0033256 A1 | 2/2010 | Strabley et al. | |
| 2014/0060178 A1 | 3/2014 | Wong et al. | |
| 2014/0190254 A1* | 7/2014 | Bouyer | G01V 7/04 |
| | | | 73/382 G |
| 2015/0090028 A1* | 4/2015 | Zahzam | G01P 15/08 |
| | | | 73/382 R |

FOREIGN PATENT DOCUMENTS

| | | | | |
|---|---|---|---|---|
| CN | 107328355 A | * | 11/2017 | ......... G01B 9/02015 |
| CN | 107328355 A | | 11/2017 | |
| CN | 109066274 A | | 12/2018 | |
| CN | 110112648 A | | 8/2019 | |
| CN | 110718853 A | | 1/2020 | |
| WO | 2019021010 A1 | | 1/2019 | |

OTHER PUBLICATIONS

V. Schkolnik, et al., A compact and robust diode laser system for atom interferometry on a sounding rocket, Applied Physics B, 2016, pp. 1-8, vol. 122, No. 217.

Fabien Theron, et al., Frequency-doubled telecom fiber laser for a cold atom interferometer using optical lattices, Optics Communications, 2017, pp. 152-155, vol. 393.

Fabien Theron, et al., Narrow linewidth single laser source system for onboard atom interferometry, Applied Physics B, 2015, pp. 1-5, vol. 118.

Jie Fang, et al., Realization of a compact one-seed laser system for atom interferometer-based gravimeters, Optics Express, 2018, pp. 1586-1596, vol. 26, No. 2.

Qingoing Hu, et al., Towards a juggling 87Rb atomic dual fountain, AIP Advances, 2018, pp. 035316-1-035316-7, vol. 8.

Xu Zhang, et al., Influence of cooling lights' low-frequency pointing instability on the quality of magneto-optical trapping, Journal of the Optical Society of America B, 2019, pp. 3531-3537, vol. 36, No. 12.

Xuejian Wu, et al., Multiaxis atom interferometry with a single-diode laser and a pyramidal magneto-optical trap, Optica, 2017, pp. 1545-1551, vol. 4, No. 12.

* cited by examiner

| Passing Component | Time Division Multiplexing | |
|---|---|---|
| | Cooling light and repumping light generation | Raman light generation |
| Stabled Frequency Laser | $f_0/2$ | $f_0/2$ |
| EOM1 | $f_0/2 - 6.4GHz$, $f_0/2$, $f_0/2 + 6.4GHz$ | $f_0/2 - 5.484GHz$, $f_0/2$, $f_0/2 + 5.484GHz$ |
| NBOF1 | $f_0/2 + 6.4GHz$ | $f_0/2 + 5.484GHz$ |
| EOM2 | $f_0/2$, $f_0/2 + 6.4GHz$, $f_0/2 + 12.8GHz$ | $f_0/2 - 1.35GHz$, $f_0/2 + 5.484GHz$, $f_0/2 + 12.318GHz$ |
| NBOF2 | $f_0/2$, $f_0/2 + 6.4GHz$ | $f_0/2 - 1.35GHz$, $f_0/2 + 5.484GHz$ |
| PPLN2 | $f_0$, $f_0 + 6.4GHz$, $f_0 + 12.8GHz$ | $f_0 - 2.7GHz$, $f_0 + 4.134GHz$, $f_0 + 10.968GHz$ |

$f_0$ is the corresponding frequency of cooling light

FIG. 7

SINGLE-LASER LIGHT SOURCE SYSTEM FOR COLD ATOM INTERFEROMETERS

CROSS REFERENCE TO RELATED APPLICATIONS

This application is the national phase entry of International Application No. PCT/CN2020/131052, filed on Nov. 24, 2020, which is based upon and claims priority to Chinese Patent Application No. 202010810469.7, filed on Aug. 13, 2020, the entire contents of which are incorporated herein by reference.

TECHNICAL FIELD

The present invention belongs to the field of quantum-precision measurement based on cold atom interferometry, particularly, a single-laser light source system for cold atom interferometers.

BACKGROUND

Atom interferometry utilizes the matter wave characteristics of atoms as a research tool, and is widely applied in precision measurements, such as high-precision rotational angular velocity, gravitational acceleration, universal gravitational constant, and other physical quantity measurements. In the cold atom interferometer, cold atoms act as the measurement-sensitive medium. Compared with other measurement means such as optical interferometer, the use of cold atoms has the advantages of long-free evolution time, small velocity distribution of the atomic cloud, short de Broglie wavelength and large relative mass, etc., resulting in better coherence both in spatial and velocity distributions, and thus enables high measurement sensitivity, high precision, and excellent long-term stability.

The whole process of cold atom interference consists of three stages, the preparation stage for the cold-atom cloud, the atom interference stage, and the atom detection stage. Firstly, a target cold-atom cloud is obtained by the process including atom cooling and trapping, velocity selection, and initial state preparation. Secondly, atom interference is proceeded by atom beam splitting-reflection-combination. Finally, interference fringes are obtained by the final-state detection to extract the relevant measurement information. In that process, light beams with different frequencies and power, such as the cooling light, the repumping light, the blow-away light, the Raman light, and the detection light, are used, and they are all provided by a laser source system. In order to meet the demands for practicality, commodification, and portable measurement of the atom interferometer, it is desirable to design a compact laser system with simple structure, small size, low power consumption, excellent stability, high integration and low cost. Most of the prior-reported laser source systems are built on the laboratory optical platform, which could not meet the demands of transportability and outdoor practicality for a portable cold atom interferometer. In recent years, several groups working on the cold-atom interferometer have conducted exploratory studies to realize the engineering modularization of the laser source system. At present, a modularized integrated laser source system can be designed according to two schematic solutions. The first is a multi-laser light source system and the second is a single-laser light source system.

In a multi-laser light source system, a reference laser is generally locked to a referenced atom-transition frequency by certain frequency stabilization methods, and then by optical phase-locked loop technology, multiple lasers are locked to the reference laser simultaneously or at different times, resulting in laser outputs of multiple frequencies. A typical multi-laser system is the highly reliable multi-laser system for a space cold atom interferometer developed by Humboldt University in Germany (Schkolnik V, Hellmig O, Wenzlawski A, et al. *A compact and robust diode laser system for atom interferometry on a sounding rocket* [J]. Applied Physics B, 2016, 122(8):217). The system uses four free-space 780 nm lasers, includes miniaturized optical devices, and adopts a cascade configuration, which has reduced the size of the system to a certain extent but requires a lot of devices and has a high cost, high power consumption, and poor debuggability. The system requires a lot of work for optical path alignment at the early stage of the optical path construction. Besides, a relatively mature design is a dual-laser light source system developed by the French Aerospace Lab (Theron F, Bidel Y, Dieu E, et al. *Frequency-doubled telecom fiber laser for a cold atom interferometer using optical lattices* [J]. Optics Communications, 2017, 393:152-155). The system adopts 1560 nm lasers and fiber frequency-doubling technology, which is technically-matured, spatially optical alignment-free, and reduces difficulties in system construction but has the disadvantages of large size and high power consumption. In addition, the risks of system failure increase in a multi-laser system due to the occurrence of laser source breakdown.

The solution of a single-laser light source system can save the costs and space that multiple lasers require and is more appealing for the engineering of the laser source. Depending on the requirements for optical frequency manipulation in atom interferometers, a single-laser light source system is generally required to obtain a frequency-tunable laser output with some methods. For example, the frequency of the initial light is changed according to the demand for lights of different frequencies, the sidebands are generated through a phase modulator, such that laser outputs with multiple frequencies are produced. A typical single-laser light source system based on a 1560 nm fiber laser for onboard atom interferometer was developed by the French Aerospace Lab (Theron F, Carraz O, Renon G, et al. *Narrow linewidth single laser light source system for onboard atom interferometry* [J]. Applied Physics B, 2015, 118(1):1-5). The system adopts a phase modulator to generate sidebands and locks the +1-order sideband to the atomic transition spectral line. The frequency of the laser output is changed by changing the modulation frequency applied to the phase modulator, which is a substitute for the slave laser and the optical phase-locked loop in a dual-laser system. Subsequently, the sidebands are generated by the phase modulator, and finally, a target light is obtained by a frequency doubling device. The system generates all lights in the atom interference process only by a single laser and uses 1560 nm fiber optical devices, which improves the system integration level and reduces the system size. However, considering the frequency hopping to be performed during the system implementation, which sets higher requirements for the frequency locking system and the bandwidth of the laser frequency tuning, the frequency locking performance of this system is unsatisfactory. Besides, the Wuhan Institute of Physics and Mathematics has also proposed a compact single-laser system (Fang Jie, Hu Jiangong, et al. *Realization of a compact one-seed laser system for atom interferometer-based gravimeters*. [J]. Optics Express, 2018). The system uses a 780 nm laser as a seed source and uses a phase modulator to generate the sidebands and locks the +1-order sideband to the atomic transition spectral line. Then additional sidebands are generated by the phase modulator to obtain the light with the target frequency. However, optical devices in the 780 nm band are underdeveloped, costly, and poorly integrated. Moreover, all the above-mentioned laser system solutions have a sideband effect in generating the Raman light, which has a severe impact on the precision of atom interferometers.

Therefore, in order to solve the technical problems of laser source systems for cold atom interferometers in the prior art, there is an urgent need to design an integrated single-laser light source system, which has low cost, low power consumption, good portability, a small size, and the ability to eliminate the Raman sideband effect.

SUMMARY

To solve the above-mentioned technical problems of laser source systems for cold atom interferometers in the prior art, the present invention provides a single-laser light source system for cold atom interferometers, including:

a reference light module and an optical frequency shift module.

The reference light module includes a laser and a frequency stabilization module. The reference light module is configured to provide a laser source with stable frequency and narrow bandwidth.

The optical frequency shift module includes a first electro-optic modulator and a first narrow-bandwidth optical-fiber filter. The first electro-optic modulator is connected to the first narrow-bandwidth optical-fiber filter by an optical fiber, and the first electro-optic modulator is connected to the laser by an optical fiber.

The first electro-optic modulator receives an initial light from the laser source, modulates the initial light by a modulation signal with a preset frequency, and generates sidebands with the preset frequency.

The first narrow-bandwidth optical-fiber filter filters the optical signal at the output of the first electro-optic modulator to obtain a frequency-shifted light as the +1-order sideband. The frequency-shifted light is used for modulation to obtain a measurement and control light of the cold atom interferometer.

Further, the reference light module further includes a beam splitter. The beam splitter is positioned between the laser and the frequency stabilization module. One path of the light from the beam splitter is directed to the frequency stabilization module, and the other is directed to the first electro-optic modulator.

Further, the beam splitter further outputs one path of a blow-away light, and the blow-away light is controlled by an optical shutter.

Further, the present invention further includes a single-sideband modulation module. The optical frequency shift module is connected to the single-sideband modulation module by an optical fiber.

Further, the single-sideband modulation module includes a second electro-optic modulator and a second narrow-bandwidth optical-fiber filter. The second electro-optic modulator and the second narrow-bandwidth optical-fiber filter are connected by an optical fiber.

Further, the second narrow-bandwidth optical-fiber filter includes an optical circulator, an optical grating, an input, a reflection output, and a transmission output. The optical circulator is connected to the input, the transmission output, and the reflection output, respectively. The optical grating is positioned between the optical circulator and the transmission output.

Further, the present invention further includes an optical power amplifier and an acousto-optic modulator. The single-sideband modulation module is connected to the optical power amplifier and the acousto-optic modulator by optical fibers sequentially.

Further, the present invention further includes a power control module. The power control module is electrically connected to the acousto-optic modulator through an instantaneous power measurement and control module to stabilize the total output power.

Further, the present invention further includes a power control module. The power control module performs voltage modulation on the electro-optic modulator through a local oscillator to stabilize the power ratio of the output light.

Further, the laser is either a 780 nm laser or a 1560 nm laser.

When the laser is the 1560 nm laser, both the reference light outputted from the reference light module and the measurement and control light outputted from the optical frequency shift module are required to be optically frequency-doubled and converted to the wavelength of 780 nm by passing through a fiber power amplifier and a frequency doubling crystal.

The present invention has the following advantages.

(1) Only one single-frequency laser source is required to output laser beams of all frequencies for a cold atom interferometer, and the laser itself is only required to output a fixed frequency for frequency stabilization to the atomic transition spectral line without the need for frequency hopping and frequency sweeping, which reduces the demands for laser frequency modulation bandwidth and performance, thus expanding the selection range of single-frequency laser sources and making it possible for a laser source to have a small frequency modulation range, a fast response bandwidth, a small size and a low cost.

(2) Almost all the prior-reported phase-modulating laser source systems are based on a cooling light as the fundamental frequency light for phase modulation, and the frequency transformation is complex. The technical solution of the present invention proposes to first generate the repumping light and the high-frequency component of the Raman light by frequency shifting, then generate the cooling light and the low-frequency component of the Raman light by phase modulation on the former ones as the fundamental frequency, which is an innovative process of the generation mechanism for the cooling light, the repumping light and a pair of Raman light, thus reducing the complexity of frequency manipulation and improving the stability of the system.

(3) Based on the locked laser frequency, the first electro-optic modulator EOM1 and the first narrow-bandwidth optical-fiber filter NBOF1 can achieve a large frequency shift in the GHz range, which is a substitute for the slave laser and the phase-locked loop in the multi-laser system, and effectively reduces the size, cost, and power consumption of the system.

(4) The second electro-optic modulator EOM2 and the second narrow-bandwidth optical-fiber filter NBOF2 are configured to generate the Raman light with a single sideband. The second narrow-bandwidth optical-fiber filter NBOF2 filters the extra sideband components generated by phase modulation, thereby effectively eliminating the Raman sideband effect caused by the phase modulation and improving the atom interferometer precision.

(5) By introducing the power stabilization module, the present invention utilizes the beat note detection between the frequency-stabilized reference laser and the Raman laser pair to extract the power ratio signal of the Raman light, which is processed to feedback control the modulation depth, therefore realizing an efficient, low-cost, and fine stabilization control of the Raman light power ratio to reduce the Stark effect, which is the fluctuations of the atomic energy level caused especially by the fluctuations in laser intensity and the Raman light power ratio, and reducing its impacts on the precision and the long-term stability of the atom interferometer.

(6) The optical system for the atom interferometer provided by the present invention mainly uses the fiber optic devices in the 1560 nm communication band or the 780 nm band, which is highly integrated, has low cost and small size, and only uses a single-laser light source to generate the laser beams required for the cold atom interferometer by optical multiplexing. The present invention has the characteristics of high integration, low cost, low power consumption, and portability. The present invention is of great significance and practical value for the engineering realization of the laser system for high-precision atom interferometers.

In addition to the objectives, features, and advantages described above, there are other objectives, features, and advantages of the present invention. The present invention will be described in further detail below with reference to the drawings.

BRIEF DESCRIPTION OF THE DRAWINGS

The drawings which form a part of this application are used to provide a further explanation of the present invention, and the embodiments of the present invention and the description thereof are used to explain the present invention and do not constitute an undue limitation of the present invention. In the drawings:

FIG. 7 is a schematic diagram of the generation process of the cooling light, the repumping light, and the Raman light during the optical multiplexing.

DETAILED DESCRIPTION OF THE EMBODIMENTS

Embodiments of the present invention are described in detail below in conjunction with the drawings, but the present invention may be implemented in many different ways as limited and covered by the claims.

Figure 1:
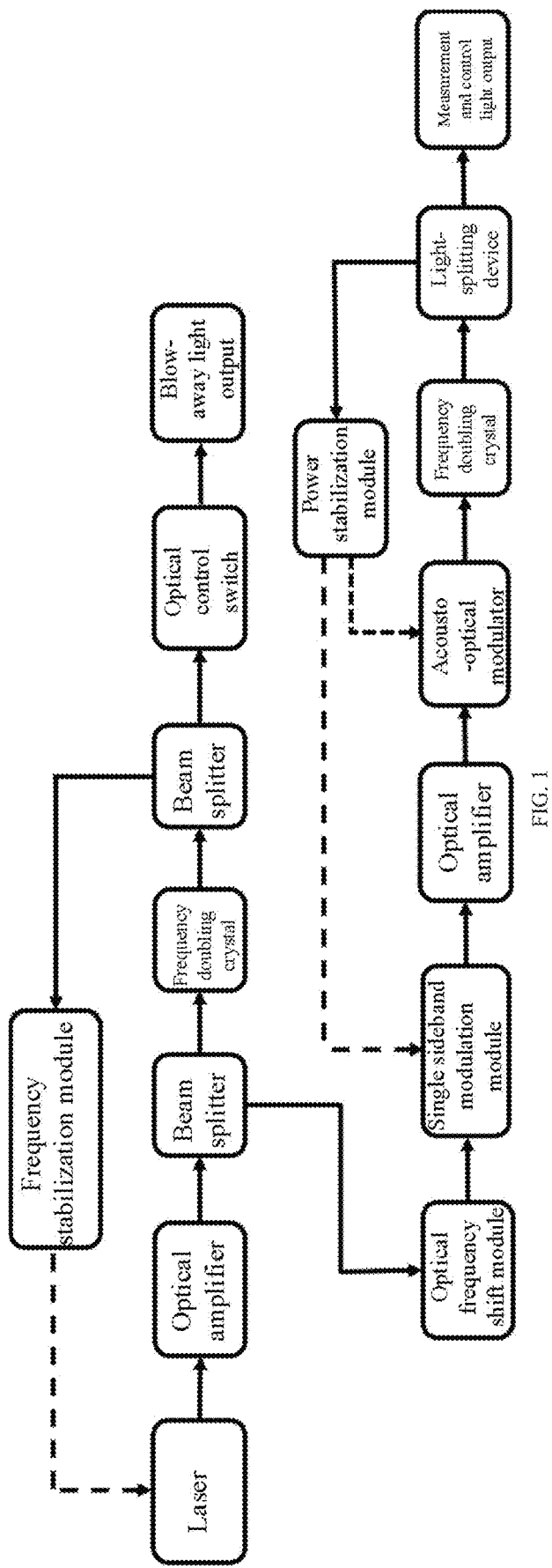
FIG. 1 is a schematic diagram of the structure of a single-laser light source system for cold atom interferometers based on electro-optical modulation according to the present invention.

As shown in FIG. 1, the present invention provides a single-laser light source system for cold atom interferometers, including:

a reference light module and an optical frequency shift module.

The reference light module includes a laser and a frequency stabilization module. The reference light module is configured to provide a laser source with stable frequency and narrow bandwidth.

The optical frequency shift module includes a first electro-optic modulator and a first narrow-bandwidth optical-fiber filter. The first electro-optic modulator is connected to the first narrow-bandwidth optical-fiber filter by an optical fiber, and the first electro-optic modulator is connected to the laser by an optical fiber.

The first electro-optic modulator receives an initial light from the laser source, modulates the initial light by a modulation signal with a preset frequency, and generates sidebands with the preset frequency.

The first narrow-bandwidth optical-fiber filter filters the optical signal at the output of the first electro-optic modulator to obtain a frequency-shifted light as the +1-order sideband. The frequency-shifted light is used for modulation to obtain a measurement and control light of the cold atom interferometer.

Since almost all the prior-reported phase-modulating light source systems are based on a cooling light as the fundamental frequency light for phase modulation, the frequency transformation is complex. The technical solution of the present invention proposes to first generate the repumping light and the high-frequency component of the Raman light by frequency shifting, then generate the cooling light and the low-frequency component of the Raman light by phase modulation on the former ones as the fundamental frequency, which is an innovative process of the generation mechanism for the cooling light, the repumping light and a pair of Raman light, thus reducing the complexity of frequency manipulation and improving the stability of the system.

In addition, based on the locked laser frequency, the first electro-optic modulator EOM1 and the first narrow-bandwidth optical-fiber filter NBOF1 can achieve a large frequency shift in the GHz range, as a substitute for the slave laser and the phase-locked loop in the multi-laser system, which effectively reduces the size, cost, and power consumption of the system.

In an embodiment, the reference light module further includes a beam splitter. The beam splitter is positioned between the laser and the frequency stabilization module. One path of the light from the beam splitter is directed to the frequency stabilization module, and the other is directed to the first electro-optic modulator.

The beam splitter further outputs one path of a blow-away light, and the blow-away light is controlled by an optical shutter.

In an embodiment, the present invention further includes a single-sideband modulation module. The optical frequency shift module is connected to the single-sideband modulation module by an optical fiber. Specifically, the single-sideband modulation module includes a second electro-optic modulator and a second narrow-bandwidth optical-fiber filter. The second electro-optic modulator and the second narrow-bandwidth optical-fiber filter are connected by an optical fiber. The single-sideband modulation module further includes an optical power amplifier and an acousto-optic modulator. The single-sideband modulation module is connected to the optical power amplifier and the acousto-optic modulator by optical fibers sequentially.

Figure 6:
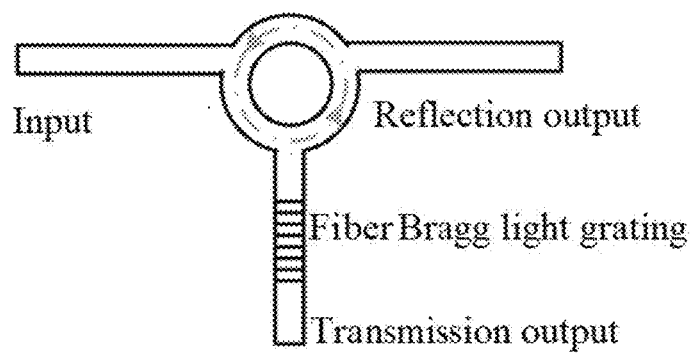
FIG. 6 is a schematic diagram of the structure of a narrow-bandwidth optical-fiber filter.

As shown in FIG. 6, both the first narrow-bandwidth optical-fiber filter and the second narrow-bandwidth optical-fiber filter include an optical circulator, a fiber Bragg optical grating, an input, a reflection output, and a transmission output. The optical circulator is connected to the input, the transmission output, and the reflection output, respectively. The optical grating is positioned between the optical circulator and the transmission output. The optical circulator is a multi-port non-reciprocal optical device, where the incident light can only propagate in one direction inside the optical circulator.

The second electro-optic modulator EOM2 and the second narrow-bandwidth optical-fiber filter NBOF2 are configured to generate the Raman light with a single sideband. The second narrow-bandwidth optical-fiber filter NBOF2 filters the extra sideband components generated by the phase modulation, thereby effectively eliminating the Raman sideband effect caused by the phase modulation and improving the atom interferometer precision.

In an embodiment, the present invention further includes a power control module. The power control module is electrically connected to the acousto-optic modulator through an instantaneous power measurement and control module to stabilize the total output power. The power control module may further perform voltage modulation on the electro-optic modulator through a local oscillator to stabilize the power ratio of the output light.

By introducing the power stabilization module, the present invention utilizes the beat note detection between the frequency-stabilized reference laser and the Raman laser pair to extract the power ratio signal of the Raman light, which is processed to feedback control the modulation depth, therefore realizing an efficient, low-cost, and fine stabilization control of the Raman light power ratio to reduce the Stark effect, which is the fluctuations of the atomic energy level caused especially by the fluctuations in laser intensity and the Raman light power ratio, and reducing its impacts on the precision and the long-term stability of the atom interferometer.

Specifically, the laser is either the 780 nm laser or the 1560 nm laser. When the laser is the 1560 nm laser, both the reference light outputted from the reference light module and the measurement and control light outputted from the optical frequency shift module are required to be optically frequency-doubled and converted to the wavelength of 780 nm by passing through a fiber power amplifier and a frequency doubling crystal.

The present invention requires only one single-frequency laser source to output laser beams of all frequencies for cold atom interferometers. The laser itself is only required to output a fixed frequency for frequency stabilization to the atomic transition spectral line, without need for frequency hopping and frequency sweeping, which reduces the demand for laser frequency modulation bandwidth and performance, thereby expanding the selection range of single-frequency laser sources and making it possible for a laser source to have a small frequency modulation range, a fast response bandwidth, a small size and a low cost.

Figure 2:
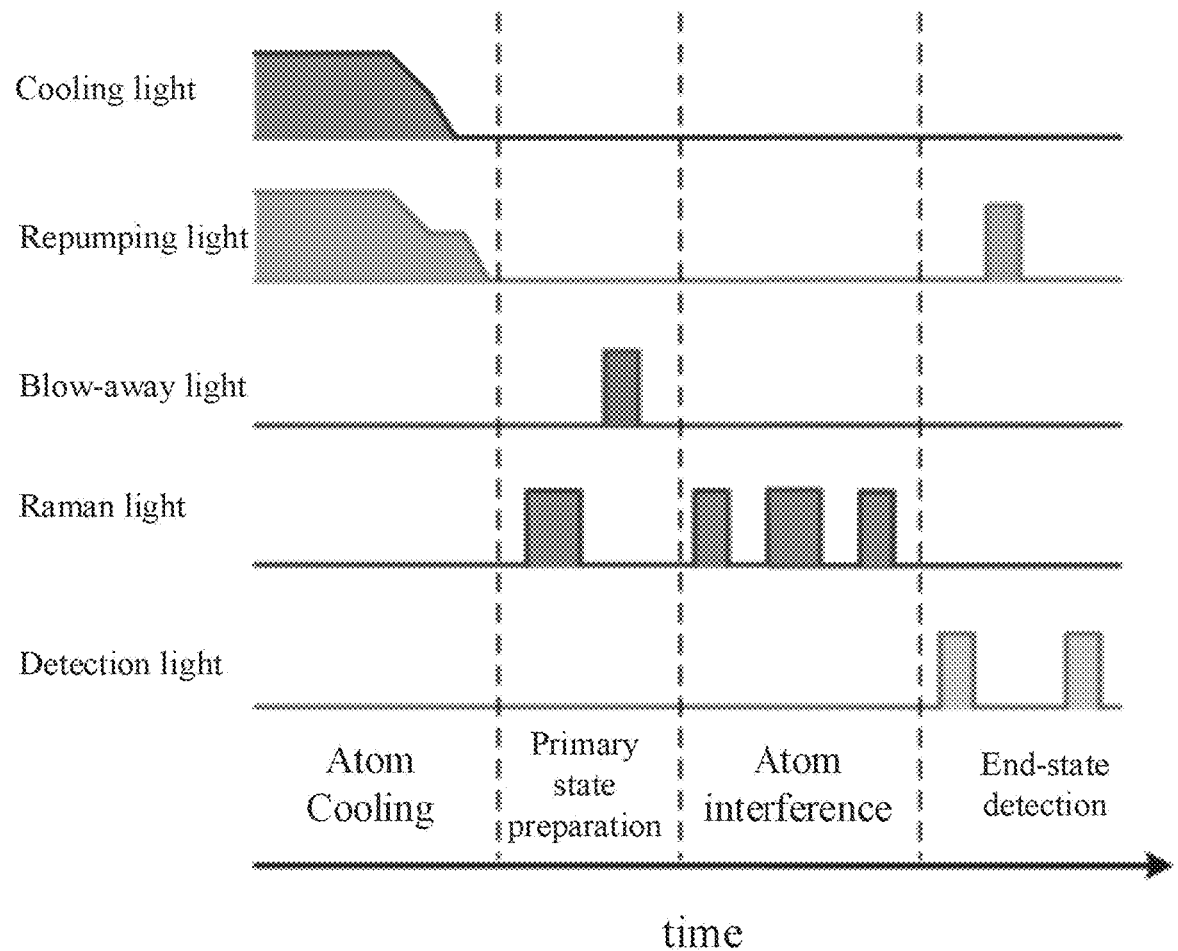
FIG. 2 is a schematic diagram of the measurement process of an $^{87}$Rb atom interferometer.
Figure 3:
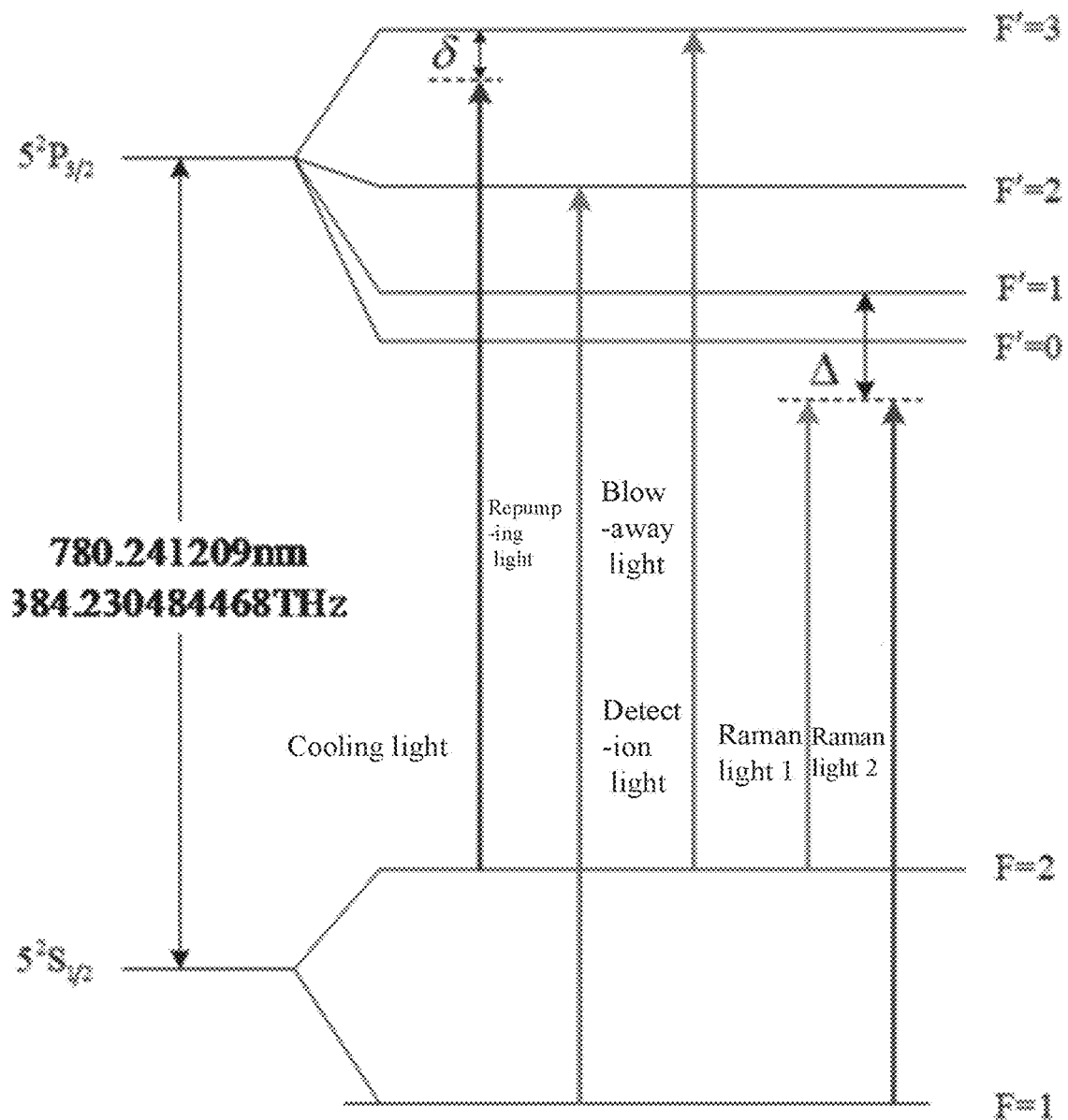
FIG. 3 is a schematic diagram of the $^{87}$Rb D2 line energy level and the corresponding laser frequency.

The $^{87}$Rb atom interferometry process is shown in FIG. 2, which includes four steps: the atom cooling and trapping, the initial state preparation, the atom interference, and the atom final-state detection, corresponding to multiple laser outputs with different frequencies and power, including the cooling light, the repumping light, the blow-away light, the Raman light and the detection light, etc., which are generated and outputted by an integrated laser source system. FIG. 3 is a schematic diagram of the $^{87}$Rb D2 line energy level and the corresponding laser frequencies. The laser beams required in the measurement process of the $^{87}$Rb atom interferometer include the cooling light, the repumping light, the blow-away light, the Raman light, and the detection light. The cooling light and the repumping light are the two laser beams that are configured to cool the atoms in the magneto-optical trap. The cooling light is red-detuned by $\delta=2\Gamma\sim6\Gamma$ with respect to the $|5^2S_{1/2}, F=2\rangle \rightarrow |5^2S_{3/2}, F'=3\rangle$ transition (where $\Gamma$ is the natural bandwidth and the value is about 6 MHz). Since some of the atoms in the $|F=2\rangle$ state are driven to the $|F'=2\rangle$ state due to the cooling light and then fall back to the $|F=1\rangle$ "dark state", a resonant repumping light corresponding to the $|5^2S_{1/2}, F=1\rangle \rightarrow |5^2S_{3/2}, F'=2\rangle$ transition is added to re-pump the atoms in the "dark state" back to the $|F=2\rangle$ state, constituting a complete cooling cycle. The frequency of the blow-away light is resonant with the $|5^2S_{1/2}, F=2\rangle \rightarrow |5^2S_{3/2}, F'=3\rangle$ transition to blow away all the atoms remaining in the F=2 state, leaving only the atoms in the $|F=1, m_F=0\rangle$ state to participate in the subsequent interference. During the operation, the blow-away light is a traveling wave that cannot share the subsequent optical paths with the rest of the light and requires independent output and switching control. The frequencies of the Raman light are red detuned by $\Delta$ with respect to the $|5^2S_{1/2}, F=1\rangle \rightarrow |5^2S_{3/2}, F'=1\rangle$ and $|5^2S_{1/2}, F=2\rangle \rightarrow |5^2S_{3/2}, F'=1\rangle$ transitions and have a frequency difference of 6.834 GHz to drive the two-photon stimulated Raman transition for the interaction with the atoms. The bandwidth of the laser is required to be within 100 kHz and their phase difference is required to be locked to a constant value. The detection light has the same frequency as the blow-away light and forms a standing wave for the detection of the atomic population. As shown in FIG. 2, in the atom interferometer process, the laser source system outputs the laser lights with different frequencies and power by the timing control device according to the timing sequence.

Figure 4:
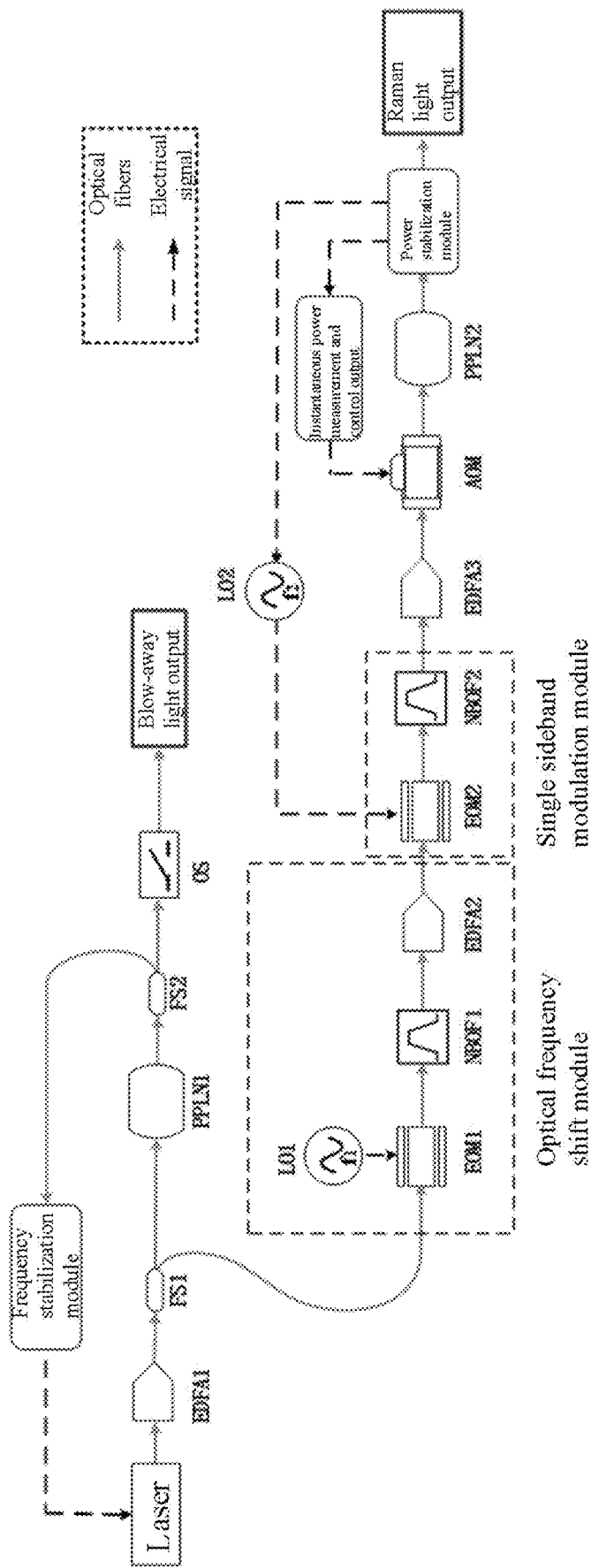
FIG. 4 is a system diagram of the integrated all-fiber single-laser light source of the $^{87}$Rb atom interferometer in a preferred embodiment of the present invention.

In an embodiment, the optical system diagram of an integrated all-fiber single-laser light source for $^{87}$Rb atom interferometer is shown in FIG. 4, and it can be divided into two modules: the reference light module and the measurement and control optical path module.

The reference light module includes a 1560 nm laser source, a first erbium-doped fiber amplifier EDFA1, a first frequency doubling crystal PPLN1, an optical shutter OS, and a frequency stabilization module. The reference light module is configured to stabilize the frequency of the laser, output the blow-away light, and provide a stable and narrow-bandwidth laser source for the subsequent measurement and control optical path module. The light emitted from the 1560 nm laser is power amplified by the first erbium-doped fiber amplifier EDFA1 and then divided into two beams by a first fiber beam splitter FS1. One beam is used for the subsequent measurement and control optical path module, and the other beam is directed into the PPLN1 for frequency doubling to obtain the 780 nm laser. The 780 nm laser output is divided into two beams by a second fiber beam splitter FS2. One beam is directed to the frequency stabilization module to lock the frequency-doubled 780 nm laser to the transition spectral line of F=2→F'=3 of $^{87}$Rb, and the other beam is passed through the optical shutter OS and then functions as the blow-away light. The optical shutter OS is configured to control the output of the blow-away light.

The measurement and control optical path module features optical multiplexing and is configured to output all laser beams (the cooling light, the repumping light, the Raman light and the detection light, etc.) except for the blow-away light (as shown in FIG. 7). The measurement and control optical path module includes the first electro-optic modulator EOM1, the second electro-optic modulator EOM2, the first narrow-bandwidth optical-fiber filter NBOF1, the second narrow-bandwidth optical-fiber filter NBOF2, the second erbium-doped fiber amplifier EDFA2, the third erbium-doped fiber amplifier EDFA3, the acousto-optic modulator AOM, the second frequency doubling crystal PPLN2, the power stabilization module, and the instantaneous power measurement and control module. As shown in FIG. 4, the output frequency of the laser source is $f_0/2$. A high-frequency signal with frequency $f_1$ is applied to EOM1 through the first local oscillator LO1 to generate the sidebands, then the +1-order sideband of EOM1 is filtered out by NBOF1. The combined effects of EOM1 and NBOF1 shift the output frequency of the laser source to the target position, and then the laser output is power amplified by EDFA2 and is inputted to EOM2. Next, a high-frequency signal with frequency $f_2$ is applied to EOM2 through the second local oscillator LO2, then the target laser is filtered out by NBOF2 and is power amplified by EDFA3. The AOM is configured to perform power control and switching on the output laser. Finally, the target laser light is outputted by frequency doubling through PPLN2. The output laser power is measured by the instantaneous power measurement and control module to be compared with the target power, and the feedback control of the AOM can control the total power of the output signal. Since there are strict requirements for the Raman light pair in the Raman light output stage, the modulation voltage of the second local oscillator LO2 is controlled by the power stabilization module to achieve power ratio stabilization. The system provides the cold atom interferometer with the required cooling light, the repumping light, the blow-away light, the detection light, the Raman light 1, the Raman light 2, etc. with different frequencies and power.

To understand the workflow of the laser system in the atom interferometer process in a graphical way, the outputs of the laser system at each stage are presented according to the timing sequence of operating the atom interferometer, as illustrated in FIG. 2.

Figure 5:
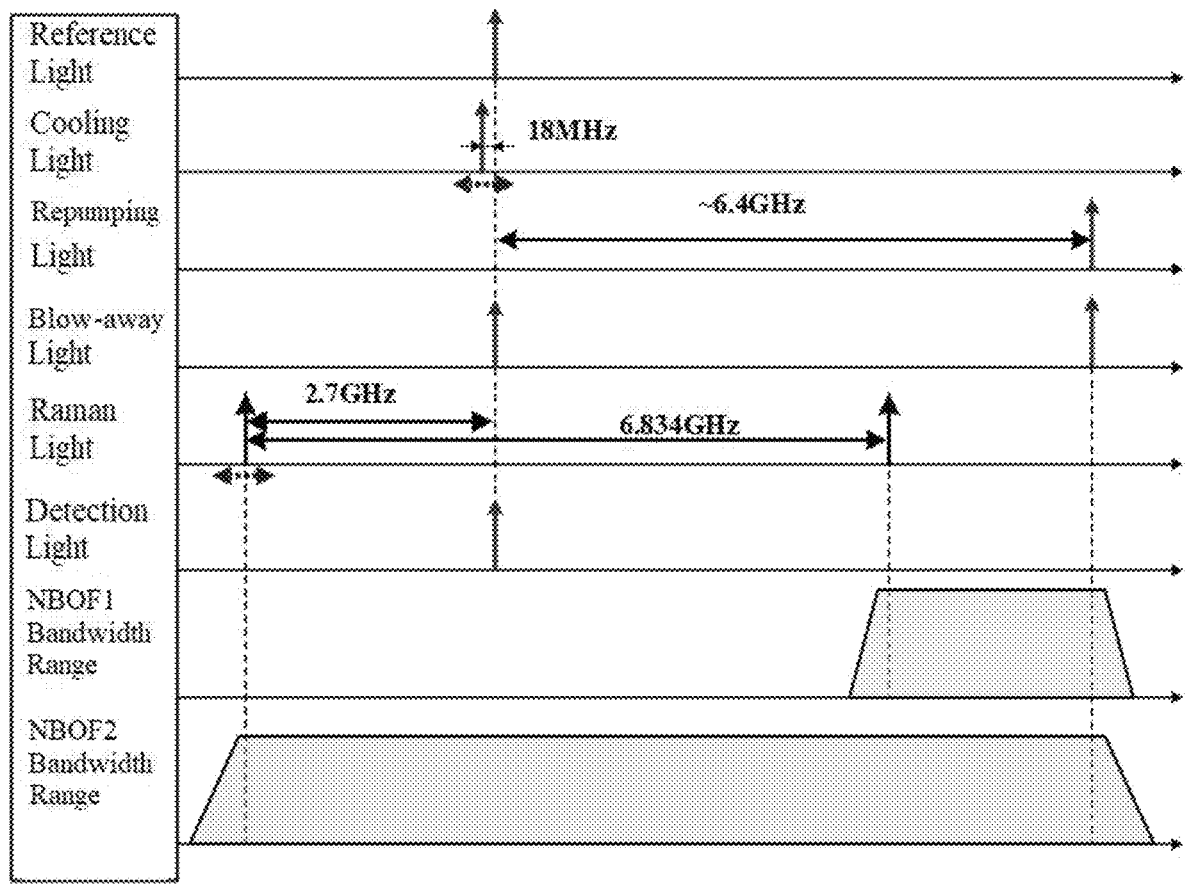
FIG. 5 is a schematic diagram of the relationship between the output optical frequencies and the bandwidth ranges of the NBOF1 and the NBOF2.

In the atom cooling stage, the cooling light and the repumping light are outputted simultaneously. The generation process of the cooling light and the repumping light is shown in FIG. 4. The 1560 nm laser from the reference light module is inputted to EOM1, and the modulation signal with frequency $f_1=6.4$ GHz is applied to EOM1 through the first local oscillator LO1. Then, the modulated light is inputted into the narrow-bandwidth optical-fiber filter NBOF1. The output bandwidth range of NBOF1 is shown in FIG. 5, and the +1-order sideband generated by EOM1 is filtered out. Then the carrier light obtained after the power amplification by EDFA2 is inputted to EOM2. A modulation signal with frequency $f_2=6.4$ GHz is applied to EOM2 through the second local oscillator LO2, and the modulated light is inputted to NBOF2. The bandwidth range of NBOF2 is larger than that of NBOF1, and the output bandwidth range of NBOF2 is shown in FIG. 5. The carrier light and the −1-order sideband are filtered out and are power amplified by EDFA3 and frequency doubled by PPLN2, so that the repumping light can be obtained as the carrier light and the cooling light can be obtained as the −1-order sideband. When the cooling light needs the function of frequency sweeping, the modulation frequency $f_2$ of EOM2 is adjusted to perform frequency sweeping on the cooling light.

In the initial state preparation stage, it is necessary to output the Raman light first and then the blow-away light. The generation process of the Raman light is shown in FIG. 4. The frequency of the voltage applied to EOM1 is changed, and a modulation signal with frequency $f_1=5.484$ GHz is applied to EOM1 through the first local oscillator LO1, so that sidebands at 5.484 GHz are generated by EOM1 and pass through NBOF1 to obtain the +1-order sideband of the EOM1. The +1-order sideband is power amplified by EDFA2 and then is inputted to EOM2. A modulation signal with frequency 1, =6.834 GHz is applied to EOM2 through the second local oscillator LO2, and the modulated light is inputted to NBOF2. The bandwidth range of NBOF2 is larger than that of NBOF1, and the output bandwidth range of NBOF2 is shown in FIG. 5. The carrier light and the −1-order sideband are filtered out by NBOF2 to obtain a pair of Raman light, and then the pair of Raman light is power amplified by EDFA3 and frequency doubled by PPLN2 to obtain the target Raman light. When the Raman light needs the function of frequency sweeping, the modulation frequency $f_2$ of EOM2 is adjusted by the second local oscillator LO2 to perform frequency sweeping on the Raman light. Then the output of the Raman light is switched off by controlling the AOM, and the optical shutter OS of the reference light module is turned on to output the blow-away light.

In the atom interference stage, the Raman light must be outputted according to the sequence of $\pi/2$-$\pi$-$\pi/2$. The optical shutter OS is turned off, the AOM is adjusted, and the measurement and control optical path module is turned on so that the Raman light is outputted according to that sequence.

In the final-state detection stage, the laser output needs to follow the "detection light-repumping light-detection light" sequence. At this time, a modulation signal with frequency $f_1=6.4$ GHz is applied to EOM1 through the first local oscillator LO1, and the modulated light is inputted into the narrow-bandwidth optical-fiber filter NBOF1 to filter out the +1-order sideband generated by EOM1, which is inputted to EOM2. Then a modulation signal with frequency $f_2=6.4$ GHz is applied to EOM2 through the second local oscillator LO2. The modulation depth of the modulation signal of EOM2 is adjusted so that the power of the carrier light is 0. At this time, the detection light is outputted. Then the modulation depth of EOM2 is adjusted again so that the power of the −1-order sideband light is 0. At this time, the repumping light is outputted. Finally, the modulation depth of the modulation signal of EOM2 is adjusted again so that the power of the carrier light is 0 and the detection light is outputted, thus the output following the "detection light-repumping light-detection light" sequence is achieved.

As shown in FIG. 5, the frequency of the reference light in the present invention is located between the frequency of the Raman light 1 and the frequency of the Raman light 2, and the frequency differences are 2.7 GHz and 4.134 GHz, respectively, so that the reference light can function as the starting light to beat with the pair of Raman light. The power of the two beat note signals are subsequently monitored by the electronics module, and then the power ratio of Raman light 1 and Raman light 2 is feedback-controlled, which cleverly realizes the measurement and control of the power ratio of the Raman light.

The above description is only a preferred embodiment of the present invention and is not intended to limit the present invention, which can have various modifications and variations recognized by those skilled in the art. Any modification, equivalent replacement, improvement, and others made within the spirit and principle of the present invention shall be included in the scope of protection of the present invention.

What is claimed is:

1. A single-laser light source system for cold atom interferometers comprising:

a reference light module and an optical frequency shift module, wherein the reference light module comprises a laser and a frequency stabilization module; the reference light module is configured to provide a laser source with stable frequency and narrow bandwidth;

the optical frequency shift module comprises a first electro-optic modulator and a first narrow-bandwidth optical-fiber filter, wherein the first electro-optic modulator is connected to the first narrow-bandwidth optical-fiber filter by an optical fiber, and the first electro-optic modulator is connected to the laser by an optical fiber;

the first electro-optic modulator receives an initial light generated by the laser, modulates the initial light by a modulation signal with a preset frequency, and generates sidebands with the preset frequency;

the first narrow-bandwidth optical-fiber filter filters the optical signal at the output of the first electro-optic modulator to obtain a frequency-shifted light as the +1-order sideband; and the frequency-shifted light is used for modulation to obtain a measurement and control light of the cold atom interferometer;

further comprises a single-sideband modulation module; wherein the optical frequency shift module is connected to the single-sideband modulation module by an optical fiber;

wherein the single-sideband modulation module comprises a second electro-optic modulator and a second narrow-bandwidth optical-fiber filter; wherein the second electro-optic modulator and the second narrow-bandwidth optical-fiber filter are connected by an optical fiber; wherein the second narrow-bandwidth optical-fiber filter filters an optical signal outputted by the second electro-optic modulator to filter out a carrier light and −1-order sideband;

wherein both the first narrow-bandwidth optical-fiber filter and the second narrow-bandwidth optical-fiber filter comprise an optical circulator, an optical grating, an input, a reflection output, and a transmission output; wherein the optical circulator is connected to the input, the transmission output, and the reflection output, respectively; and the optical grating is positioned between the optical circulator and the transmission output;

wherein the reference light module further comprises a beam splitter; wherein the beam splitter is positioned between the laser and the frequency stabilization module; one path of the light from the beam splitter is directed to the frequency stabilization module, and the other is directed to the first electro-optic modulator;

wherein the beam splitter further outputs one path of a blow-away light; and the blow-away light is controlled by an optical shutter;

further comprises an optical power amplifier and an acousto-optic modulator; wherein the single-sideband modulation module is connected to the optical power amplifier and the acousto-optic modulator by optical fibers sequentially;

wherein the measurement and control light comprises a cooling light, a repumping light, a blow-away light, a Raman light pair, and a detection light; frequencies of the Raman light are red detuned by $\Delta$ with respect to $|5^2S_{1/2},F=1\rangle \to |5^2S_{3/2},F'=1\rangle$ and $|5^2S_{1/2},F=2\rangle \to |5^2S_{3/2},F'=1\rangle$ transitions and have a frequency difference of 6.834 GHz;

when the measurement and control light is the Raman light, the modulation signal of the first electro-optic modulator is $f_1$=5.484 GHz, and the modulation signal of the second electro-optic modulator is $f_2$=6.834 GHz; and when the measurement and control light is the cooling light, the frequency size of the modulation signal of the second electro-optic modulator is adjusted to perform frequency sweeping.

2. The single-laser light source system for the cold atom interferometers according to claim 1, further comprises a power control module; wherein the power control module is electrically connected to the acousto-optic modulator through an instantaneous power measurement and control module to stabilize the total output power.

3. The single-laser light source system for the cold atom interferometers according to claim 1, further comprises a power control module; wherein the power control module performs voltage modulation on the electro-optic modulator through a local oscillator to stabilize the power ratio of the output light.

4. The single-laser light source system for the cold atom interferometers according to claim 1, wherein the laser is either a 780 nm laser or a 1560 nm laser; and when the laser is the 1560 nm laser, both the reference light outputted from the reference light module and the measurement and control light outputted from the optical frequency shift module are required to be optically frequency-doubled and converted to the wavelength of 780 nm by passing through a fiber power amplifier and a frequency doubling crystal.

* * * * *